United States Patent [19]

Soeda

[11] Patent Number: 4,952,860
[45] Date of Patent: Aug. 28, 1990

[54] MOTOR CONTROL SYSTEM
[75] Inventor: Katsuji Soeda, Sukagawa, Japan
[73] Assignee: Yamamoto Electric Corporation, Sukagawa, Japan
[21] Appl. No.: 375,305
[22] Filed: Jul. 3, 1989
[30] Foreign Application Priority Data May 1, 1989 [JP] Japan .................................. 01-112726

[51] Int. Cl.⁵ .............................................. H02F 5/28
[52] U.S. Cl. ..................................... 318/721; 318/723
[58] Field of Search ............... 318/254, 700, 719, 696, 318/721, 701, 715, 702, 717, 798, 799, 800, 439, 722, 723, 254

[56] References Cited

U.S. PATENT DOCUMENTS

| | | | |
|---|---|---|---|
| 3,783,357 | 1/1974 | Ichiyanage | 318/254 |
| 4,085,355 | 4/1978 | Fradella | 318/719 |
| 4,132,931 | 1/1979 | Okuyama et al. | 318/700 |
| 4,855,652 | 8/1989 | Yamashita et al. | 318/811 |

FOREIGN PATENT DOCUMENTS

| | | | |
|---|---|---|---|
| 0155592 | 12/1980 | Japan | 318/254 |
| 0068679 | 4/1982 | Japan | 318/254 |
| 62-114494 | 5/1987 | Japan . | |

Primary Examiner—William M. Shoop, Jr.
Assistant Examiner—John W. Cabeca
Attorney, Agent, or Firm—Armstrong, Nikaido, Marmelstein, Kubovcik & Murray

[57] ABSTRACT

A control system for a motor is disclosed in which the position of a magnetic pole of the rotor of the motor is detected to produce a position signal, a multi-phase rectangular wave signal is produced by an oscillation circuit, and the frequency of the position signal is multiplied to obtain a multiple frequency signal. A stepwise wave changing stepwisely, with the same frequency as the multiple frequency, is generated. A signal corresponding to the position signal or a phase difference signal representing a phase difference between the multi-phase rectangular wave signal and the position signal is selectively applied as a drive signal to the motor by a drive signal switching circuit. A first signal is produced before the stepwise wave reaches a predetermined level and a second signal is produced when the predetermined level is reached. The drive signal switching circuit produces a signal corresponding to the position signal in response to the first signal thereby to drive the motor in brushless mode, and a signal corresponding to the phase difference signal in response to the second signal thereby to drive the motor in sync mode.

5 Claims, 9 Drawing Sheets

FIG. 1

FIG.3(a) CP3 OUTPUT WAVEFORM

FIG.3(b) CP1 OUTPUT WAVEFORM

FIG.3(c) CP5 OUTPUT WAVEFORM

FIG.3(g) OP4 OUTPUT WAVEFORM (THREE-PHASE RECTANGULAR WAVE)

FIG.3(h) TERMINAL VOLTAGE WAVEFORM OF RESISTOR R34

FIG.3(i) CP7 OUTPUT WAVEFORM

FIG.3(j) DIFFERENTIATED OUTPUT WAVEFORM OF C5

FIG.3(k) OP12 OUTPUT WAVEFORM

FIG.3(ℓ) OP11 OUTPUT WAVEFORM
--- CLEAR WAVEFORM TO BASE OF Tr1

FIG.3(m)
OP16 OUTPUT WAVEFORM
WAVEFORM AT POSITIVE TERMINAL OF OP16
WAVEFORM AT NEGATIVE TERMINAL OF OP16
CLEAR WAVEFORM

FIG.3(n) THREE-PHASE OSCILLATION WAVEFORM TO POSITIVE TERMINAL OF OP3 IN SYNC MODE

FIG.3(o) POSITION SIGNAL WAVEFORM AT NEGATIVE TERMINAL OF OP3 IN SYNC MODE
(---INCREASED LOAD)

FIG.3(p) OP3 OUTPUT WAVEFORM

FIG.3(q) OP3 OUTPUT WAVEFORM AT INCREASED LOAD

FIG.3(r) INTEGRATED WAVEFORM AT POSITIVE TERMINAL OF OP14
NEGATIVE TERMINAL VOLTAGE OF OP14

FIG.3(s) OP14 OUTPUT WAVEFORM

FIG.3(t) VOLTAGE WAVEFORM AT POSITIVE TERMINAL OF OP3 (SOLID LINE) VOLTAGE WAVEFORM AT NEGATIVE TERMINAL OF OP3 (DOTTED LINE) (IN BRUSHLESS MODE)

FIG.3(u) OP3 OUTPUT WAVEFORM IN BRUSHLESS MODE

MOTOR CONTROL SYSTEM

BACKGROUND OF THE INVENTION

The present invention relates to a motor control system, or more in particular to a motor control system low in cost and suitable for speed regulation with simple configuration.

A motor such as a sync motor does not generate any rotational torque at other than a sync speed and has a starting torque substantially equal to zero. As a result, a self-starting method with a starting (brake) winding or a starting auxiliary motor is required.

The sync motor is a constant-speed motor adapted for rotating at a sync speed and is difficult in speed control. By changing the sync speed, however, the speed control is possible. Specifically, the speed control of this type of motor can be attained by changing either the frequency of a power supply or the number of poles thereof. The method with a changing power frequency is applicable to the motor operated with an exclusive power generator. The method with the number of poles changed, on the other hand, requires the number of poles of the armature windings and the number of fields to be switched at the same time.

The above-mentioned conventional sync motor, however, is difficult to start, and requires a special starter, thereby making the configuration thereof complicated and the cost thereof high. In a sync motor, the load current of which is comparatively small but increases with the decrease in speed, it is difficult to regulate the speed thereof over a wide range from high to low levels. Further, if the sync motor is to be decreased in size and improved in efficiency, a strong permanent magnet is required as a rotor thereof. For this purpose, a very expensive rare earth magnet is used.

In order to resolve these problems, the inventors of the present invention have suggested "A Synchronous Motor Control System" as disclosed in JP-A-62-114494. In this sync motor control system, a conduction phase operation circuit compares an output of a three-phase rectangular wave oscillation circuit controlled by a frequency control signal with a phase control signal thereby to control the conduction phase and to control the start of a sync motor automatically. The conduction phase operation circuit used in such a conventional control system cuts off the current input unrequired for torque by differentiating a current value. With the position of the rotor magnet changed forward or backward with load, however, accurate control has actually been sometimes impossible.

In order to overcome this drawback, it was proposed by the same inventors as the present invention in Japanese Patent Application No. 62-259399 that at least a Hall sensor is mounted on the primary side of a power transformer (PT) in a stator box for detecting the position of the rotor and the conduction phase operation circuit compares a position detection signal from the Hall sensor with the phase control signal.

According to this control apparatus, the conduction phase operation circuit compares a position detection signal from the Hall sensor with the phase control signal thereby to effect accurate current control which would be insufficient by a mere differentiation of a current value.

As a result, more accurate automatic start control and a wider range of speed control of a sync motor become possible.

A sharp start-up of this control system may be impossible, however, in view of the fact that the motor is started by a control signal from a frequency regulation circuit for producing a frequency control signal giving an instruction to increase the oscillation frequency from zero linearly to a predetermined high frequency.

Further, although this control system would not pose any problem under such a load as may be allowed corresponding to the torque characteristic of the motor, the motor may step out and become impossible to start in the case where the load is displaced from a torque curve, that is, under a load beyond the control of the control system.

In order to overcome the above-mentioned inconvenience, there was proposed by the same inventors as the present invention in Japanese Patent Application No. 63-131012 a sync motor control system which comprises a multi-phase motor, a multi-phase rectangular wave oscillation circuit, a position detecting unit for detecting the position of magnetic poles of the rotor of the multi-phase sync motor, a first DC voltage generation circuit for generating a DC voltage proportional to the rotational frequency of the rotor, a second DC voltage generation circuit for generating a DC voltage corresponding to the frequency from the multi-phase rectangular wave oscillation circuit, a comparator circuit for comparing output signals of the aforementioned two DC voltage generation circuits with each other and producing an output signal only when the DC voltage of the latter exceeds that of the former, and a drive control circuit for applying a signal to the excitation drive circuit of the motor for driving the motor as a brushless motor in accordance with an output signal from the magnetic pole position detection unit upon application thereto of an output signal from the comparator circuit and applying a signal to the excitation drive circuit for driving the motor as a sync motor upon application thereto of an output signal from the multi-phase rectangular wave oscillation circuit.

In this apparatus, when a power switch is turned on, an oscillation circuit is energized to generate a predetermined frequency, which is taken out as a corresponding DC voltage at a second DC voltage generation circuit and is applied to a comparator. The voltage generated at a rotor magnetic pole position detection unit, on the other hand, is taken out as a DC voltage proportional to the rotational frequency of the rotor at a first DC voltage generation circuit and is also applied to the comparator. The comparator, comparing the two input voltages thereto, produces an output signal only when the voltage on the rotor side is lower than the voltage on the oscillation circuit side, that is, when the rotor speed fails to reach the sync speed. This output signal is applied to a drive control circuit thereby to start the motor as a brushless motor. When the voltage on the rotor side reaches the same level as that on the oscillation circuit side, that is, when the rotational speed of the rotor reaches the sync speed, the comparator does not produce any output signal, but the motor is driven as a sync motor on the basis of a sync motor drive signal sent from the oscillation circuit to the drive control circuit. As a result, at the time of starting, the motor is driven according to the starting characteristic of a brushless motor, and when a sync speed is reached, is switched to a sync motor, thus making it possible to start up the motor sharply and drive it in stable manner.

In the case where power is switched on in the control system mentioned above, however, the frequency of the three-phase rectangular wave oscillation reaches a designated value only after the lapse of a certain length of time (one second divided by several minutes), and therefore a false operation may develop in switching from brushless motor to synchronous mode. Further, the second and first DC voltages obtained by differentiation and integration from the three-phase oscillation frequency and the rotational frequency respectively as used for switching may develop a ripple in the value thereof or may be delayed in time, sometimes causing an unstable switching operation.

SUMMARY OF THE INVENTION

An object of the present invention is to provide a motor control system for solving the above-mentioned problem.

According to the present invention, in order to achieve the object, there is provided a motor control system comprising a motor (2), a position detection unit (700, CP1 to CP7, R34) for detecting the positions of the magnetic poles of the rotor of the motor and producing a position signal, a multi-phase rectangular wave oscillation circuit (702, OP1 to OP3) for oscillating a multi-phase rectangular wave signal, a frequency multiplier (712, C5, OP12) for multiplying the position signal to a predetermined frequency and producing a multiple frequency signal, a clear circuit (714, Tr1) for producing a phase of rectangular wave signal out of the multi-phase rectangular wave signal as a clear signal, a stepwise wave generation circuit for generating a stepwise wave changing stepwisely with the same frequency as the multiple frequency in accordance with the multiple frequency signal and adapted to be cleared by the clear circuit, a drive signal switching circuit (718, OP3 to OP7) for applying a signal corresponding to the position signal or a phase difference signal between the multi-phase rectangular wave signal and the position signal selectively as a drive signal to the motor, a speed detection circuit (720, OP16) for producing a first signal before the level of the stepwise wave from the stepwise wave generation circuit reaches a predetermined value and a second signal when the predetermined value is reached, and instruction means (710, SW3) for selectively designating the validity or invalidity of the drive signal produced from the drive signal switching circuit, wherein the drive signal switching circuit produces a signal corresponding to the position signal in response to the first signal and thereby to drive the motor in brushless mode and produces the phase difference signal in response to the second signal thereby to drive the motor in sync mode.

As a result, before a predetermined speed is reached, the motor is driven in brushless mode by a drive signal produced from a signal corresponding to the position signal, and when the predetermined speed is reached, the motor is switched automatically from brushless mode to sync mode in a stable manner by a drive signal produced from a phase difference signal between a multi-phase rectangular wave oscillation signal and the position signal.

Further, the control system according to the invention preferably comprises a second speed detection circuit (722, OP14) for producing a third signal when the level of the stepwise wave from the stepwise wave generation circuit exceeds a predetermined value, so that the drive signal produced from the drive signal switching circuit is invalidated in response to the third signal, whereby if the motor when started increases in speed and exceeds a predetermined speed, the drive signal is automatically de-energized thereby to reduce the motor speed to the predetermined level for a sync mode of operation.

Furthermore, the control system preferably comprises second instruction means (706, SW1) interposed between the output of the position detection means and the input of the multiplier for preventing selectively the position signal from being applied to the multiplier, thus making it possible to drive the motor only in brushless mode.

Furthermore, the control system preferably comprises third instruction means (708, SW2) for giving an instruction to invert the phase of the position signal from the position detection means selectively thereby to drive the motor in reverse direction selectively.

DESCRIPTION OF THE PREFERRED EMBODIMENT

A typical embodiment of the present invention will be explained below.

Figure 1:
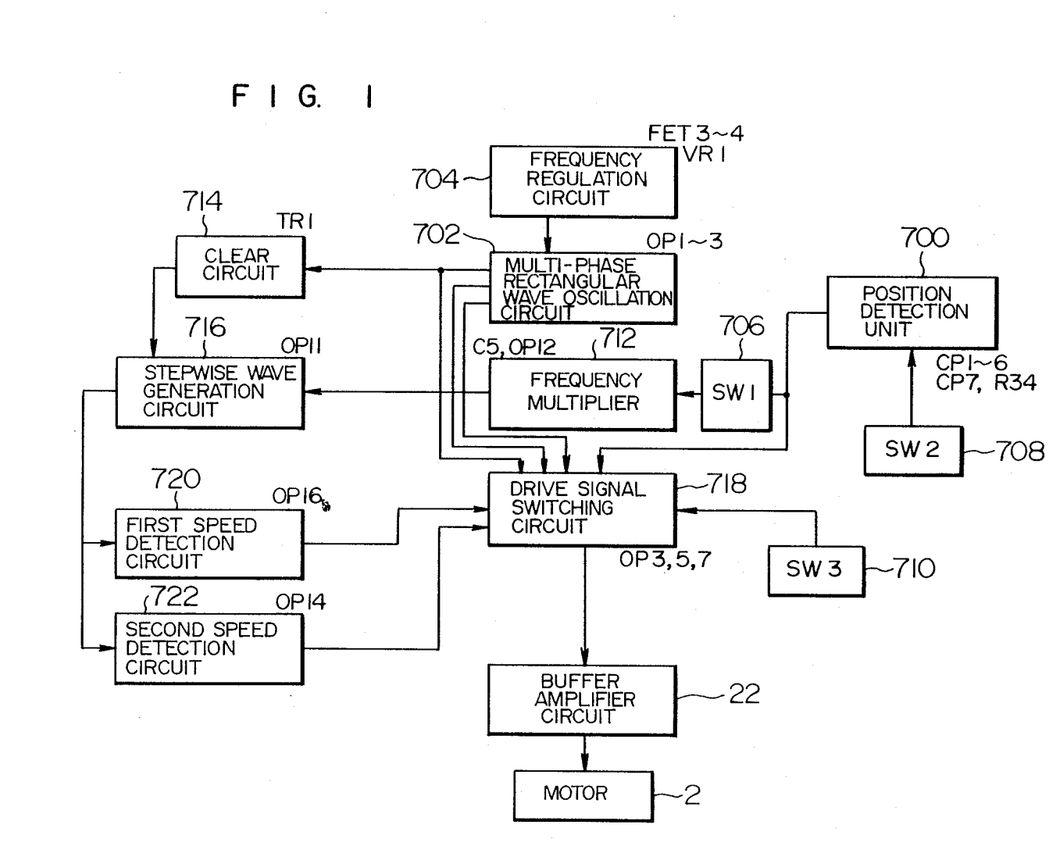
FIG. 1 is a block diagram showing a motor control system according to an embodiment of the present invention.

A block diagram showing a configuration of an embodiment of the present invention is shown in FIG. 1. In FIG. 1, numeral 2 designates a motor driven by a drive signal applied thereto through a buffer amplifier circuit 22, numeral 700 a position detection means (CP1 to CP7, R34) for detecting the position of magnetic poles of the rotor of the motor and producing a position signal, numeral 702 a multi-phase rectangular wave oscillation circuit (OP1 to OP3) for oscillating a multi-phase rectangular wave signal such as a three-phase rectangular wave signal, numeral 712 a frequency multiplier (C5, OP12) for multiplying the frequency of the position signal to a predetermined frequency and producing a multiple frequency signal, numeral 714 a clear circuit (Tr1) for producing a rectangular wave signal of a given phase of the multi-phase rectangular signal as a clear signal, numeral 716 a stepwise wave generation circuit (OP11) for producing a stepwise wave which changes stepwise with the same frequency as the multiple frequency in accordance with the multiple frequency signal and cleared by the clear signal, numeral 718 a drive signal switching circuit (OP3 to OP7) for applying a selected one of a signal corresponding to the position signal or a phase difference signal between the multi-phase rectangular wave signal and the position signal to the motor as a drive signal, numeral 720 a first speed detection circuit (OP16) for producing a first signal before the level of the stepwise wave from the stepwise wave generation circuit reaches a predetermined value, and a second signal when the predetermined value is reached, and numeral 710 a first instruction means (SW3) for selectively designating the validity or invalidity of the drive signal produced from the drive signal switching circuit. The drive signal switching circuit produces a position signal thereby to operate the motor as a brushless motor in response to a first signal and produces a phase difference signal thereby to operate the motor as a sync motor in response to a second signal.

Until a predetermined speed is reached, therefore, the motor is run in brushless mode on the basis of a signal corresponding to the position signal, and when the predetermined speed is reached, a sync operation is attained automatically by a drive signal prepared on the basis of the phase difference between the multi-phase rectangular oscillation signal and the phase difference signal.

Numeral 722 designates a second speed detection circuit (OP14) for producing a third signal when the level of the stepwise wave of the stepwise wave generation circuit exceeds a predetermined value. The drive signal produced from the drive signal switching circuit is rendered ineffective in response to the third signal. As a result, if the motor increases in speed after being started and exceeds a predetermined speed level, the drive signal is automatically de-energized, so that the motor speed is decreased to a predetermined level thereby to attain a sync operation.

Numeral 706 designates a second instruction unit (SW1) interposed between the output of the position detection unit and the input of the multiplier for giving an instruction to selectively prevent the position signal from being applied to the multiplier, thus making it possible to run the motor in brushless mode.

Numeral 708 designates a third instruction unit (SW2) for giving an instruction to selectively invert the phase of the position signal from the position detection unit whereby the motor is selectively driven in the reverse direction.

Now, this embodiment will be explained with reference to the circuit diagram shown in FIG. 2 and the signal waveforms of FIG. 3 produced at various parts in FIG. 2.

Figure 2:
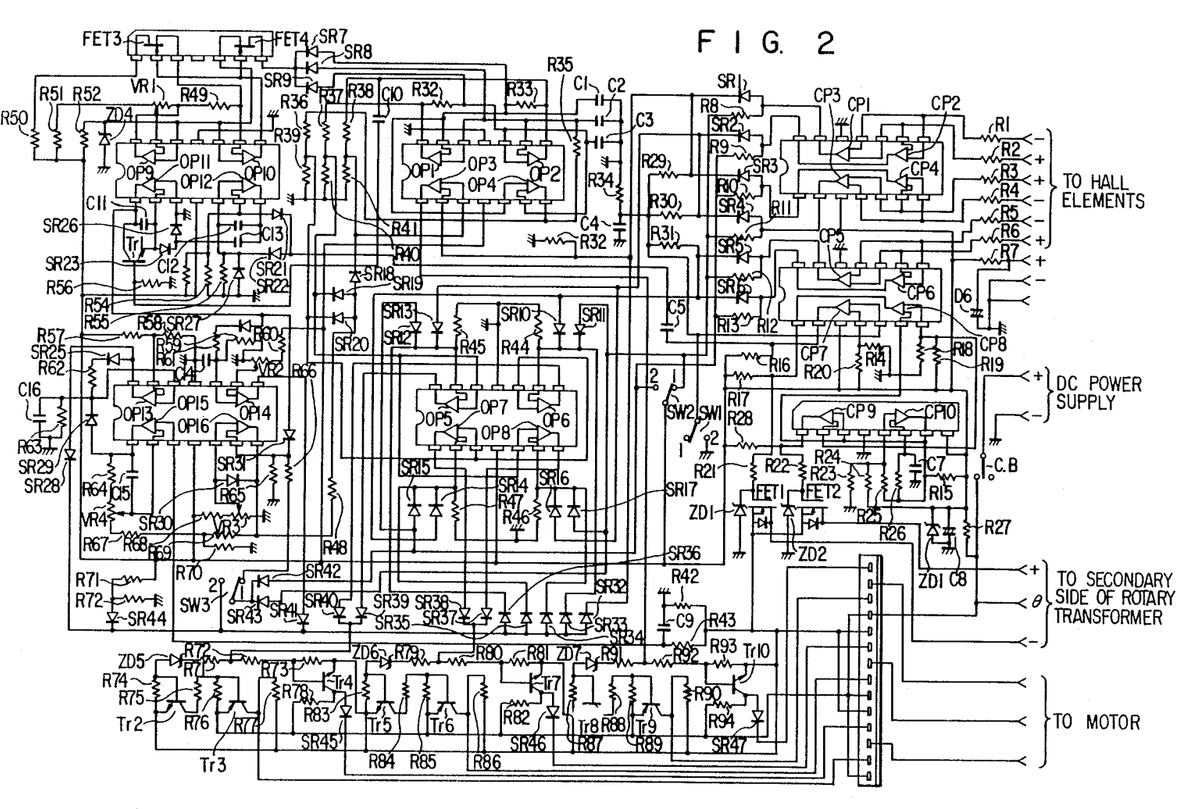
FIG. 2 is a typical circuit diagram of the motor control system shown in FIG. 1.
Figure 3A:
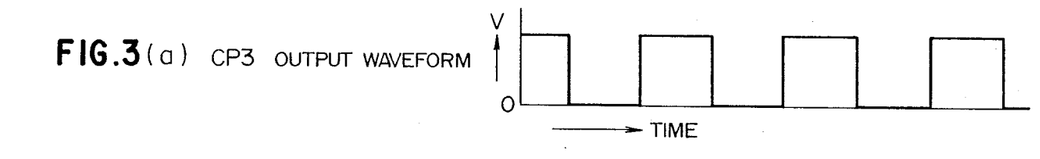
FIG. 3 shows signal waveforms produced at various parts in FIG. 2.
Figure 3B:
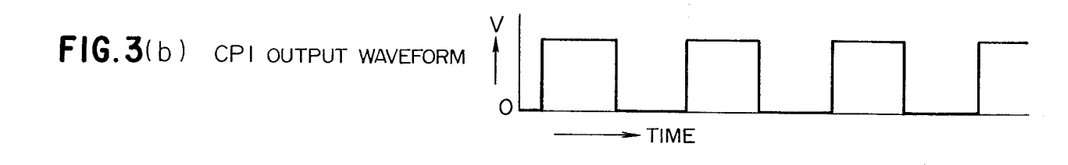
Figure 3C:
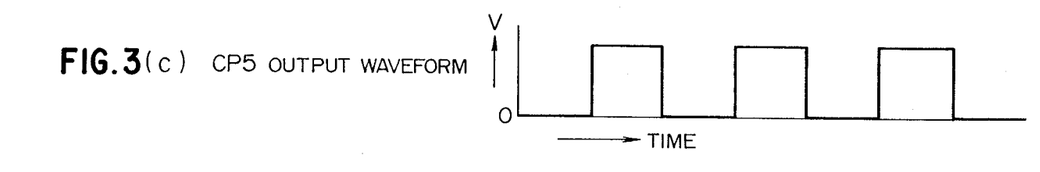
Figure 3D:
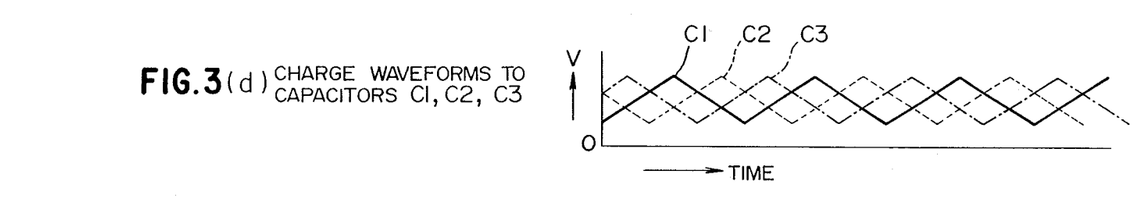
Figure 3E:
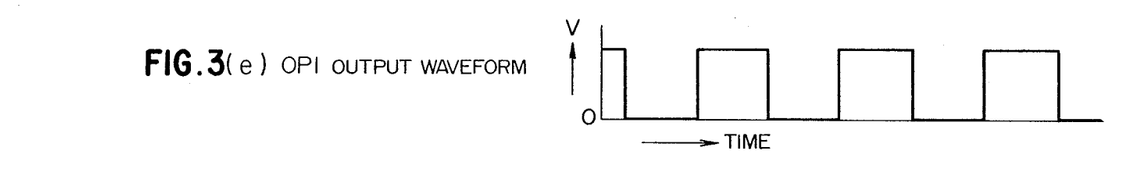
Figure 3F:
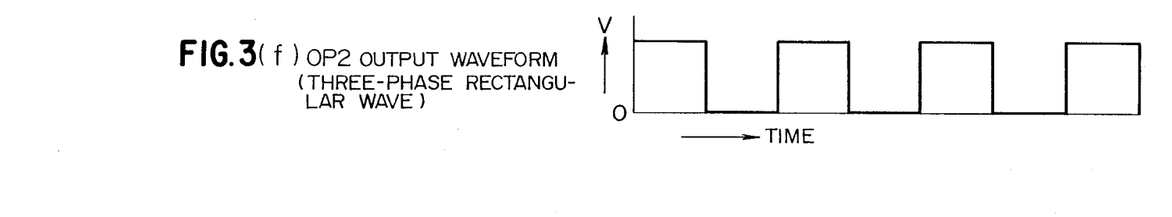
Figure 3G:
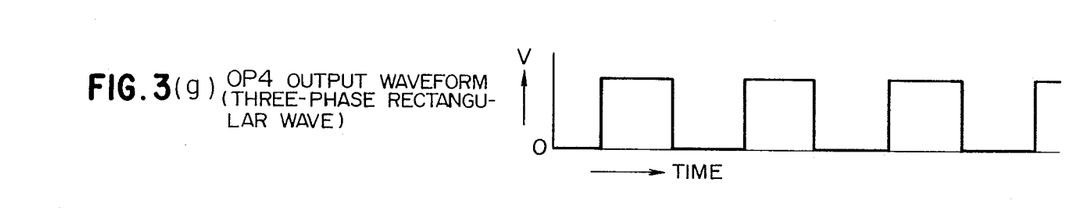
Figure 3H:
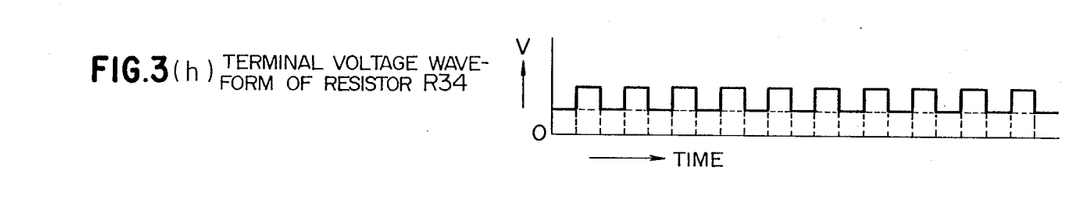
Figure 3I:
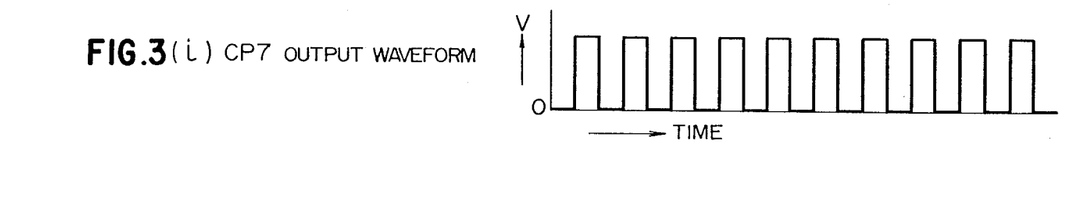
Figure 3J:
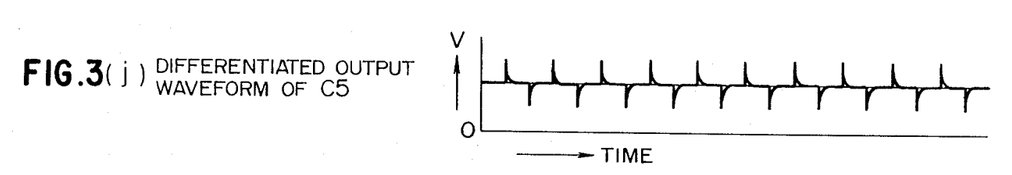
Figure 3K:
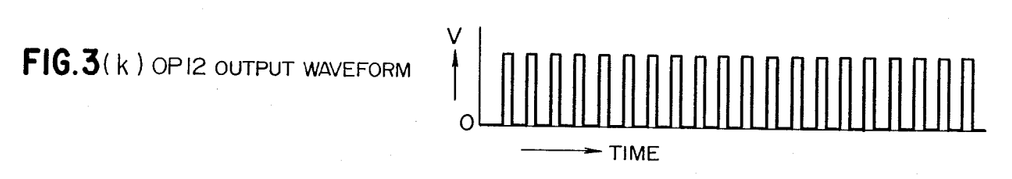
Figure 3L:
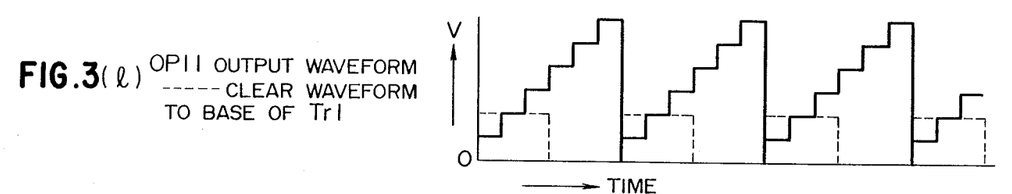
Figure 3M:
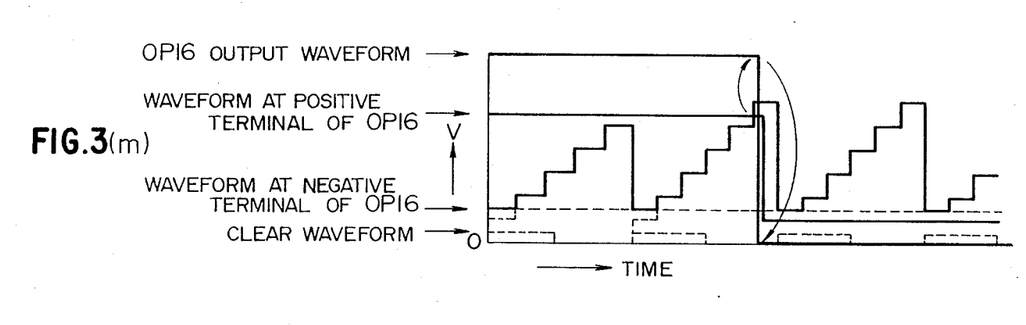
Figure 3N:
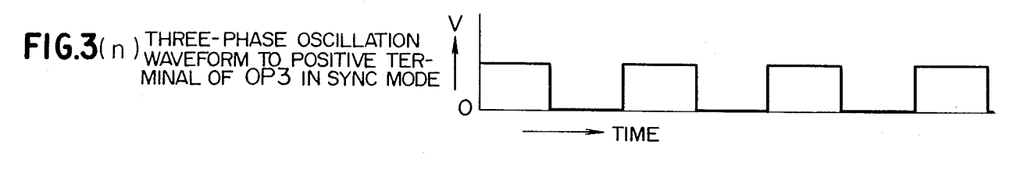
Figure 3O:
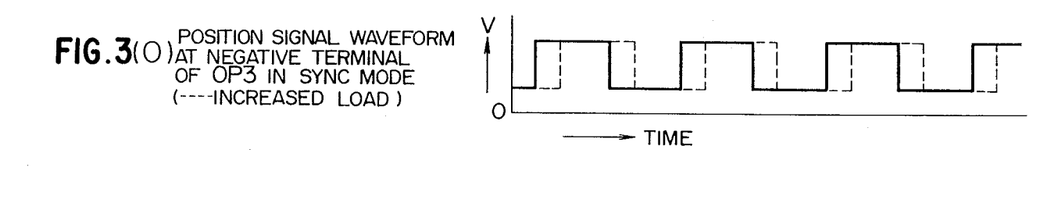
Figure 3P:
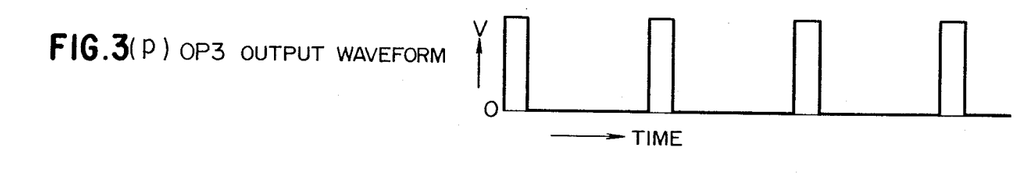
Figure 3Q:
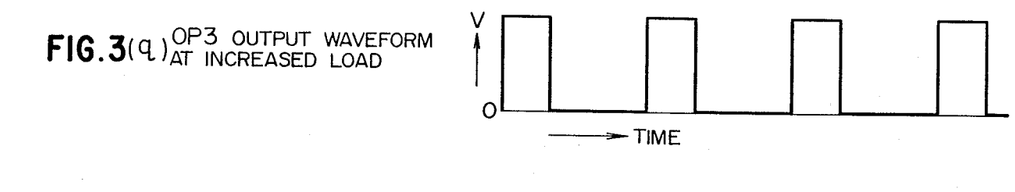
Figure 3R:
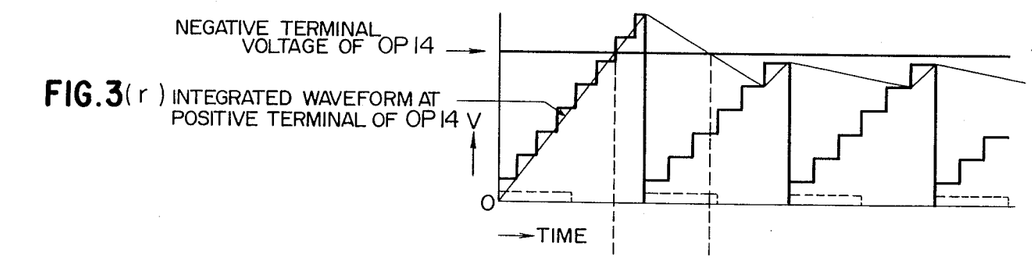
Figure 3S:
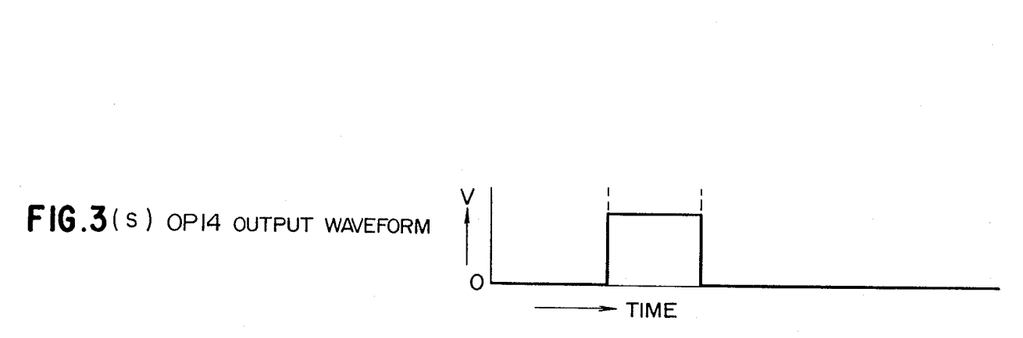
Figures 3T, 3U:
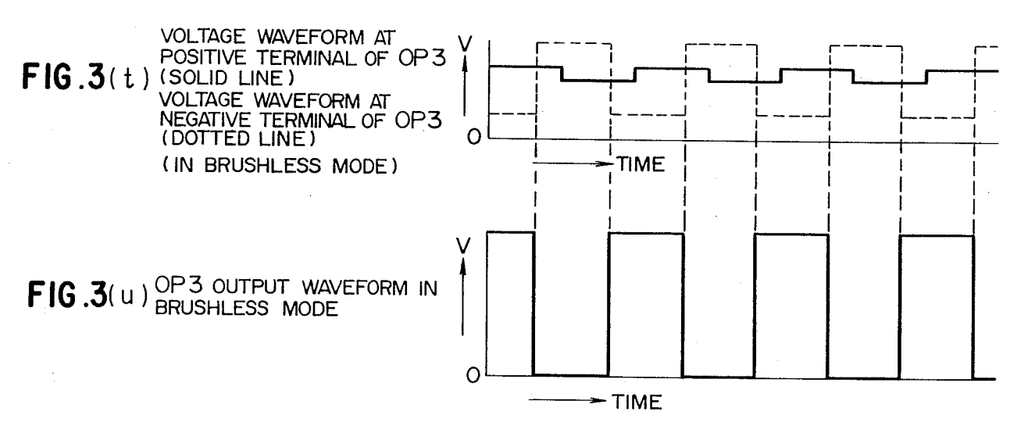

In FIG. 2, the motor position detector (such as a Hall element) is not shown. There are provided three Hall elements, for example, to apply a position detection signal to the resistors R1 to R6 at the time of each 120-degree rotation of the rotor.

First, the motor is connected to this system and power is turned on. It is assumed that the switch SW1 is connected to a contact 1, the switch SW2 to the contact 2 and the switch SW3 to a contact 2.

When the switch SW1 is turned to the contact 2, the motor is capable of being operated only in brushless mode, while if the switch SW2 is turned to the contact 1 side, the motor is driven in the reverse direction. When the switch SW3 is at contact 2, on the other hand, the motor is stopped while when it is turned to contact 1, the motor is started.

Each position-detecting Hall element is supplied with a voltage through a resistor R7, and a signal associated with a particular position produced from each Hall element is applied to the comparator CP1, CP2, CP3, CP4, CP5 or CP6. The open collector of each comparator is supplied with a source voltage through the switch SW2, and the comparators CP1, CP3 and CP5 are thus energized, thus applying a high-level or low-level signal associated with the signal to the diodes SR1, SR3 and SR5 respectively.

Output waveforms produced from the comparators CP1, CP3 and CP5 are shown in (a), (b) and (c) of FIG. 3 respectively. The comparators CP2, CP4 and CP6 to which no voltage is applied, however, remain deenergized. The operational amplifiers OP1, OP2 and OP4, upon oscillation ((e), (f) and (g) of FIG. 3), apply a three-phase rectangular wave to the resistors R36, R37 and R38 respectively. These frequencies are determined at a thermally stable level by a frequency regulation circuit 704 including a semi-fixed resistor VR1, operational amplifiers OP9, OP10 and transistors FET3, FET4.

Each of the three-phase rectangular waves is divided by half through the resistors R36, R37, R38, R39, R40 and R41 and applied to the positive terminals of the operational amplifiers OP3, OP5, OP6, OP7 and OP8. In view of the fact that the negative terminals of the operational amplifiers OP6 and OP8 are supplied with source voltage through the switch SW2, diodes SR11 and SR17 and that the negative terminals of the operational amplifiers OP3, OP5, OP6, OP7 and OP8 are impressed with the source voltage through the contact 1 of the switch SW2, diode SR43, contact 2 of the switch SW3, and diodes SR32, SR33, SR34, SR35 and SR36, however, the output terminals of the operational amplifiers remain "low" and no voltage is applied to subsequent stages of the circuit even when a signal voltage is applied to the positive terminals of these operational amplifiers.

Now, assume that the switch SW3 is turned to the contact 1 from contact 2. The negative terminals of the operational amplifiers OP3, OP5, OP6, OP7 and OP8 are not supplied with a high voltage but a low voltage (a voltage slightly higher than the forward voltage of the diode) divided by the resistors R71 and R72. In this case, the voltage that has passed through the transistor SR43 is divided by the resistors R65 and R66, and this divided voltage (a voltage slightly higher than the forward voltage of the diode SR30) is applied to the negative terminal of the operational amplifier OP16.

The positive terminal of the operational amplifier OP16 is already impressed with a voltage (set to a level slightly lower than the upper voltage at the sixth stage of a stepwise wave mentioned later) divided by the resistor R68 and the semi-fixed resistor VR3, and therefore the output of the operational amplifier OP16 assumes a value near to the source voltage. The output voltage of the operational amplifier OP16 is applied to the positive terminals of the operational amplifiers OP3, OP5, OP6, OP7 and OP8 through the diodes SR18, SR19 and SR20, together with an oscillation rectangular wave voltage divided by the resistors R36, R37, R38, R39, R40 and R41 ((t) of FIG. 3). Since the negative terminals of the operational amplifiers OP6 and OP8 are impressed with a high voltage as described above, however, the output thereof remains at low level.

The negative terminals of the operational amplifiers OP3, OP5 and OP7, on the other hand, are supplied with a position signal ((t) of FIG. 3) indicating the position of the rotor of the motor. In this case, the maximum voltage of the position signal applied to the negative terminals are set always to a higher level than the maximum voltage applied to the positive terminals.

As a result, the operational amplifiers OP3, OP5 and OP7 produce signals ((e), (f), (g) and (u) of FIG. 3) 180° different in phase from the corresponding position signals ((a), (b) and (c) of FIG. 3), which signals are applied through a buffer amplifier circuit to the motor thereby to drive the motor in the brushless mode. The motor is thus increased rapidly in speed.

The position signal from the Hall elements are obtained as a three-phase rectangular wave voltage enlarged in the comparators CP1, CP3 and CP5. The voltages of these different phases are combined and divided by the resistors R29, R30, R31 and R34, thus producing low-frequency voltages three times the basic frequencies of respective phases ((h) of FIG. 3).

The capacitor C4 is used for removing noises. The terminal voltage of the resistor R34 is applied through the capacitor C2 to the positive terminal of the comparator CP7. The negative terminal of the comparator CP7 is impressed with a voltage equivalent to the rectangular wave voltage applied to the positive terminal as divided by about half through the resistors R14 and R20. As a result, the comparator CP7 produces as an output a high voltage ((i) of FIG. 3) of a frequency three times higher than the basic frequency of the rectangular wave. This voltage is differentiated by the capacitor C5, diodes SR21, SR22 and the resistors R54 and R55 ((j) of FIG. 3) and applied as a pulse wave to the positive and negative terminals of the operational amplifier OP12.

The circuit of the operational amplifier OP12 is designed as a bidirectional monostable multivibrator, and therefore produces a pulse of rectangular wave ((k) of FIG. 3) at the time of rise and fall of the input pulse wave. As a result, a rectangular wave of a frequency double that of the pulse wave applied to the operational amplifier OP12 is produced. In other words, a rectangular wave having a frequency six times higher than that of the position signal is obtained.

This rectangular wave is applied through the capacitor C12, and diodes SR23, SR26 to the positive and negative terminals of the operational amplifier OP11. The operational amplifier OP11, capacitor C11, etc. make up a stepwise wave generation circuit. The voltage value of each step of this stepwise wave is determined by the ratio between the values of the capacitors C11 and C13.

The transistor Tr1 used in this circuit is for clearing the stepwise wave, and the base thereof is supplied with a clear signal resulting from the rectangular wave of a phase of the three-phase rectangular oscillation wave differentiated by a differentiator including the capacitor C10 and the resistor R56.

The transistor Tr1 is thus turned on by a period of a phase of the rectangular wave, and the capacitor C11 is discharged thereby to clear the stepwise wave. The waveform indicated by dotted line in (1) of FIG. 3 represents a clear signal applied to base of the transistor Tr1.

When the rotational speed of the motor is lower than the oscillation frequency of the rectangular wave, therefore, the maximum number of steps is small, which number progressively increases with the increase in rotational speed of the motor. When the oscillation frequency thus becomes equal to the rotational frequency, the maximum number of steps is six.

In the case where the rotational frequency exceeds the oscillation frequency, on the other hand, the maximum number of steps is more than six. Only the period of the clear signal changes with the oscillation frequency, and the voltage or period of the voltage of each step of the stepwise wave remains unchanged. In other words, the period of the stepwise wave is proportional to the frequency of the position signal. This stepwise wave is applied through the diode SR31 to the negative terminal of the operational amplifier OP16. Since this terminal is impressed with a voltage divided by the resistors R65 and R66 as mentioned above, however, a combination of the divided voltage and the stepwise wave ((m) of FIG. 3) is applied to the negative terminal of the operational amplifier OP16. The positive terminal of the operational amplifier OP16, on the other hand, is supplied with an upper voltage ((m) of FIG. 3) at the sixth stage of the stepwise wave as mentioned above. Thus the output voltage of the operational amplifier OP16 is at high level, and is applied to the positive terminals of the operational amplifiers OP3, OP5, OP6, OP7 and OP8. As a consequence, as mentioned above, the operational amplifiers OP3, OP5 and OP7 produce signals 180° displaced from the position signal to drive the motor.

With the increase in the rotational speed of the motor from start with such a rapidity as mentioned above, the number of steps of the stepwise wave steadily increases to six. In this stage, the oscillation frequency becomes equal to the rotational frequency. Specifically, when a designated rotational speed is reached, the potential at the positive terminal of the operational amplifier OP16 becomes higher than that at the negative potential thereof, so that the output of the operational amplifier OP16 becomes "low" ((m) of FIG. 3), and the high voltages thus far applied to the positive terminals of the operational amplifiers OP3, OP5, OP6, OP7 and OP8 are removed, thereby producing a three-phase rectangular wave oscillation signal alone.

The motor is thus driven by a three-phase rectangular wave as a sync motor. In this case, the phase rotation of the three-phase oscillation signal is designed to be identical to that of the rotor.

Each positive terminal of the operational amplifiers OP3, OP5 and OP7 is supplied with an oscillation rectangular wave ((h) of FIG. 3), and each negative terminal thereof with a position signal ((o) of FIG. 3). As a result, when the rotor rotates to a predetermined position, a corresponding Hall element is detected and a position signal is generated thereby to reduce a corresponding output of the operational amplifiers OP3, OP5 and OP7 to low level. This position signal waveform changes has a phase changing with the load as shown by dotted line of (o) of FIG. 3 (the phase being retarded with the increase in load), and therefore the pulse duration of the output waveforms of the operational amplifiers OP3, OP5 and OP7 is short against a light load ((p) of FIG. 3) and longer against an increased load ((q) of FIG. 3).

This operation improves the efficiency of the motor current in low speed ranges of a sync motor, while at the same time greatly reducing the counter-torque force, with the result that the torque is increased for an improved response and the following ability of the motor.

In the transition from brushless mode to sync operation mode, if the motor exceeds a predetermined rotational speed (sync speed) by inertia, an out-of-phase condition would occur, and the motor would be intermittently driven in brushless mode by a three-phase oscillation rectangular wave at higher than a sync speed. The stepwise wave, on the other hand, is divided and integrated by the diode SR24, resistors R59, R61 and the capacitor C14 and applied to the positive terminal of the operational amplifier OP14, the negative terminal of which is supplied with a voltage value slightly higher than the value of the sixth step of the stepwise wave by the resistor R60 and the semi-fixed resistor VR2 ((r) of FIG. 3). As a result, the output of the operational amplifier 14 remains at low level unless the integrated voltage applied to the positive terminal thereof exceeds the voltage applied to the negative terminal thereof. In spite of the requirement to switch to the sync mode when the motor started in brushless mode increases in speed with rapidity and reaches a specified rotational speed, however, assume that the specified rotational speed is exceeded while the motor is driven intermittently in brushless mode by the inertia of the rotor and load. The integrated voltage at the positive terminal exceed the voltage at the negative terminal, and therefore the output of the operational amplifier OP14 is increased to high level ((r) of FIG. 3). The output voltage of the operational amplifier OP14 ((s) of FIG. 3) is then applied through the diodes SR41, SR32, SR33, SR34, SR35 and SR36 to the negative terminals of the operational amplifiers OP3, OP5, OP6, OP7 and OP8, so that the output of each operational amplifier is reduced to low level and the motor current interrupted for a reduced speed thereof.

When the motor speed is reduced to a specified level, the output voltage of the operational amplifier OP14 is restored to low level, and the motor is energized for stable sync operation at a specified rotational speed.

If some load trouble occurs during the sync operation and the motor steps out, on the other hand, the control system starts an intermittent operation in brushless mode as mentioned above and increases the motor speed, subsequently followed by restoration of the sync speed automatically.

As mentioned above, the motor rises in speed rapidly in brushless mode and is switched to the sync speed accurately at a specified rotational speed. At the same time, the efficient operation is maintained in correspondence to the load variations.

When the motor reaches a specified sync rotational speed, the output of the operational amplifier OP16 is reduced to low level, and therefore the voltage at the positive terminal thereof assumes a status lower than the negative terminal voltage thereof equivalent to the forward voltage of the diode SR30 through the diode SR30. Thus the voltage level of the stepwise wave applied to the negative terminal, no matter how it changes, is higher than the forward voltage to the positive terminal and therefore the output is maintained at low level.

Now, assume that the contact 1 of the switch SW2 is turned to the contact 2 thereof. The comparators CP2, CP4 and CP6 are energized, and the position detection signal is inverted by 180 degree in phase. At the same time, the operational amplifiers OP6 and OP8 are turned on, with the result that the motor is started in reverse direction.

If the contacts of the switch SW2 are switched during the motor operation, the voltages at the contacts 1 and 2 are reduced to zero the instant of switching. The voltage applied to the negative terminals of the operational amplifiers after being divided through the diodes SR42, SR43 and the resistors R65, R66, therefore, is also reduced to zero lower than the voltage at the positive terminals (forward voltage of the diode SR30), with the result that the output of the operational amplifier OP16 is increased to high level. The brushless mode is thus entered with the motor rising rapidly in opposite direction. In other words, the switching between forward and reverse drives of the motor can be achieved within a short time by switching the contacts of the switch SW2.

If the power supply is connected to the contact 2 of the switch SW1, contact 1 of the switch SW2 or the contact 2 of the switch SW3, the motor is not started as mentioned above.

Under this condition, if the switch SW3 is turned to the contact 1, on the other hand, the motor is rapidly started in brushless mode and accelerated as mentioned above. Since rectangular wave voltage three times higher than the rotational frequency generated at the resistor R34 is shorted to the earth, however, no signal is transmitted to the circuit components including and subsequent to the comparator CP7. As a result, the integrated voltage is not applied to the positive terminal of the operational amplifier OP14, the output of which remains at low level. The operational amplifier OP16, the negative terminal of which is not supplied with a stepwise wave, continues to produce a high level signal. The motor is thus kept in operation in brushless mode at a speed corresponding to the load.

As explained above, the start, stop, brushless mode, sync mode and forward and reverse rotations of the motor are easily selected freely by the switches SW1, SW2 and SW3. Further, even if the oscillation frequency fluctuates immediately after power is thrown in, the oscillation frequency is stabilized by starting the motor with the switch SW3 turned to contact 1, thereby eliminating the problem of unstable oscillation frequency in the transition from brushless to sync modes.

Now, a safety circuit will be described briefly.

The load current and the drive current of the motor flow through the resistor R42 (the resistance value of which is set to about one divided by ten and several ohms). These voltages are detected, and after being smoothed by the resistor R43 and the capacitor C9, are applied to the positive terminal of the operational amplifier OP15. The voltage applied to the positive terminal of the operational amplifier OP15 is enlarged to a predetermined level, integrated and produced as an output thereof. This output is applied to the positive terminal of the operational amplifier OP13 through the diode SR29. The negative terminal of the operational amplifier OP13, on the other hand, is impressed with a voltage divided by the resistors R57 and R58. When the output voltage of the operational amplifier OP15 exceeds the divided voltage, the output of the operational amplifier OP13 is increased to high level.

The high-level output voltage of the operational amplifier OP13 is applied to the negative terminals of the operational amplifiers OP3, OP5, OP6, OP7 and OP8 through the diodes SR28, SR32, SR33, SR34, SR35 and SR36, so that the output of each operational amplifier is reduced to low level and the drive current is cut off thereby to stop the motor. The output voltage of the operational amplifier OP13 is applied also through the diode SR25, divided by the resistors R62 and R63 and applied to the positive terminal of the operational amplifier OP13. This divided voltage is higher than the voltage applied to the negative terminal thereof, and therefore even when the output voltage of the operational amplifier OP15 is reduced, the output of the operational amplifier OP13 is kept at high level. The capacitor C16 is for keeping the output of the operational amplifier OP13 at high level.

This condition is terminated by disconnecting the power supply. The safety circuit, through which a large current flows at the start of the motor, may inconveniently develop a false operation. In order to prevent such an inconvenience, the negative terminal of the operational amplifier OP15 is supplied with a voltage appropriately divided by the resistors R69 and R70 while the output of the operational amplifier OP16 remains at high level (at the time of start) thereby to suppress the output of the operational amplifier OP15 at low level, while the normal state is restored after start is completed.

As described above, according to the present invention, until a predetermined speed is reached, the motor is switched to the brushless mode by a drive signal prepared on the basis of a signal corresponding to a position signal, and when the predetermined speed is reached, the motor is switched automatically in stable manner from the brushless to the sync mode by a drive signal produced on the basis of a phase difference signal between a multi-phase rectangular oscillation wave and a position signal.

In the sync operation mode, therefore, the phase of the position signal is changed with the load fluctuation, if any, so that the pulse duration of the drive signal varies in accordance with the load variations, thus attaining a stable sync operation.

Further, in the case where the motor, gathering speed after start and exceeding a predetermined speed (sync speed), is intermittently driven in brushless mode, the drive signal is automatically turned off, and when the predetermined speed is reached by deceleration, the drive signal is supplied again, thus assuring transition to the sync operation mode without fail.

Furthermore, the forward or reverse rotation of the motor can be freely selected and switched smoothly. It is also possible to run the motor only in brushless mode.

I claim:

1. A control system for a sync motor, comprising:
   a motor including a magnetic pole rotor;
   means for detecting the position of the magnetic poles of the rotor of the motor and producing a position signal;
   a multi-phase rectangular wave oscillation circuit for generating a multi-phase rectangular wave;
   a frequency multiplier for multiplying the frequency of said position signal to a predetermined frequency and producing a multiple frequency signal;
   a clear circuit for producing a phase of said multi-phase rectangular wave signal as a clear signal;
   a stepwise wave generation circuit for generating a stepwise wave adapted to be cleared by said clear signal, said stepwise wave being changed stepwisely with the same frequency as said multiple frequency in accordance with said multiple frequency signal;
   a drive signal switching circuit for applying to said motor a drive signal selected from one of a signal corresponding to said position signal and a phase difference signal representing a phase difference between said multi-phase rectangular wave signal and said position signal;
   a speed detection circuit for producing a first signal before the level of the stepwise wave from said stepwise wave generation circuit reaches a predetermined value, and a second signal when said level reaches the predetermined value; and
   first instruction means for designating a selected one of validity and invalidity of the drive signal produced from said drive signal switching circuit;
   said drive signal switching circuit producing a signal corresponding to the position signal in response to said first signal thereby to drive said motor in brushless mode, and a signal corresponding to said phase difference signal in response to said second signal thereby to drive said motor in sync mode.

2. A control system according to claim 1 further comprising a second speed detection circuit for producing a third signal when the level of the stepwise wave from said stepwise wave generation circuit exceeds a predetermined value, the drive signal from said drive signal switching circuit being invalidated in response to said third signal.

3. A control system according to claim 1, further comprising second instruction means interposed between the output of said position detection means and the input of said multiplier for giving an instruction to prevent said position signal selectively from being applied to said multiplier thereby making it possible to operate said motor only in brushless mode.

4. A control system according to claim 1, further comprising third instruction means for giving an instruction to invert the phase of the position signal from said position detection means selectively, thereby making it possible to drive said motor in an opposite direction selectively.

5. A control system according to claim 1, wherein a signal corresponding to said position signal is 180 degrees different in phase from said position signal.

* * * * *